Jan. 15, 1924. 1,480,975
H. WICKLAND
METHOD OF ASSEMBLING BALL BEARINGS
Filed April 10, 1923
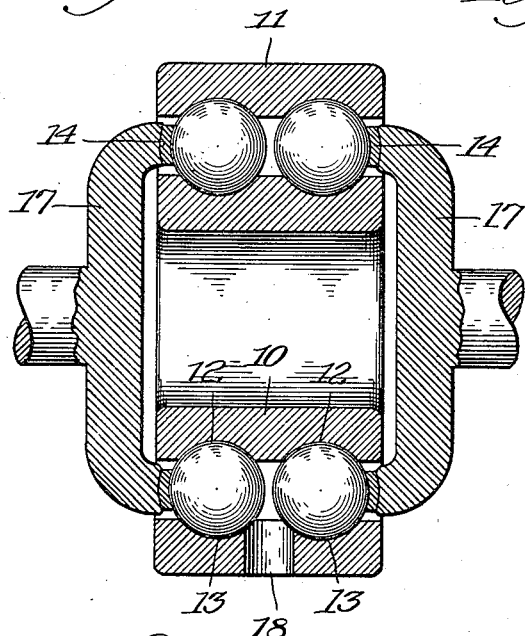
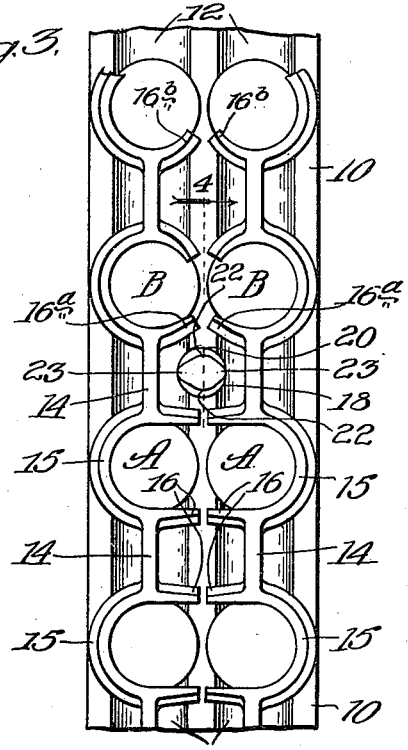
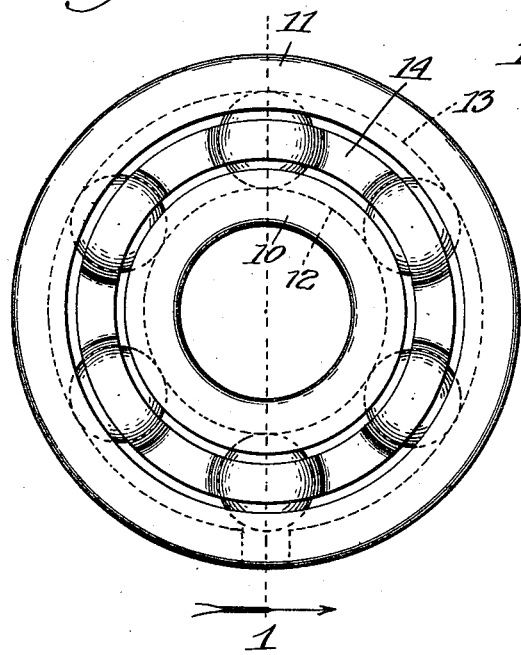
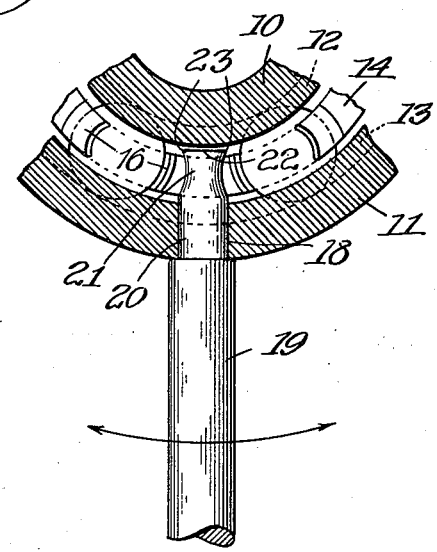
Inventor:
Harry Wickland, Patented Jan. 15, 1924.

1,480,975

UNITED STATES PATENT OFFICE.

HARRY WICKLAND, OF PHILADELPHIA, PENNSYLVANIA, ASSIGNOR TO U. S. BALL BEARING MANUFACTURING COMPANY, OF CHICAGO, ILLINOIS, A CORPORATION OF ILLINOIS.

METHOD OF ASSEMBLING BALL BEARINGS.

Application filed April 10, 1923. Serial No. 631,144.

*To all whom it may concern:*

Be it known that I, HARRY WICKLAND, a citizen of the United States, residing at Philadelphia, in the county of Philadelphia and State of Pennsylvania, have invented a new and useful Improvement in Methods of Assembling Ball Bearings, of which the following is a specification.

This invention relates to methods of assembling retainers on ball bearings and is particularly applicable to two-row ball bearings. The invention is fully described in the following specification and shown in the accompanying drawings in which—

Figure 1 is a longitudinal section through a ball bearing;

Fig. 2 is a side elevation of the same;

Fig. 3 is a developed view of the balls and retainers showing the outer race member removed and Fig. 4 is a partial transverse section on the line 4 of Fig. 3.

The embodiment illustrated comprised a double row ball bearing having inner and outer race members 10 and 11, respectively, in which are formed parallel raceways 13 and 14. These raceways are preferably uninterrupted by filling slots, the balls being assembled therein by eccentrically displacing the inner race member with respect to the outer, the balls then being placed in the raceways after which the race members are again brought into concentric relation and the balls distributed substantially as shown in Fig. 2. This method is known as the Conrad method of assembling and is shown in the United States patent to Conrad No. 822,723.

With the balls properly spaced in the raceway retainers 14 having a series of cut-like portions 15 with outwardly projecting lips 16 and are inserted over the balls from each side of the bearing. These will then have the appearance of the lips 16 as shown on the balls A, Fig. 3.

The retainers 14 are then placed between suitable clamps 17 which are adapted to fit about the cup shaped members 15 and which hold the balls in the two rows directly opposite each other as shown in Figs. 1 and 2. The clamping members 17 are journaled in suitable bearings and are adapted to be turned so as to maintain the balls of the two rows, however, constantly in the relative position shown.

An opening 18 is provided in the outer race member between the ball races so as to permit an assembling tool 19 to be inserted therethrough. This tool preferably has a reduced portion 20 which fits the opening 18 quite snugly so as to be rigidly held thereby. The inner end of the portion 20 has an arcuate portion 21 which is adapted to engage the lips 16 and to force them around so as to enclose the balls as B, Fig. 3, as the tool 19 is moved back and forth with respect to the retainers 14.

The arcuate portion 20 is preferably curved so as to accurately force the lips 16 about the balls as shown in 16$^a$, Fig. 3. For this reason, the portion 20 is made somewhat diamond shaped with obtuse angle 22 which at the first operation is placed as shown in Fig. 3. While the clamping members 17 are held rigid, the operator grasps the tool 19 and forces it together with the outer race member forward, bending the lips 16$^a$ about the balls B and then back, bending the lips 16 about the balls A. At the next forward motion of the tool 19, it is turned 90° from its present position so that angle 23 then forces the outer end of the lips as at 16$^b$ into contact with the balls B and on the next backward movement of the tool, the same operation is performed on the lips 16.

The operator then withdraws the tool 19, turns the outer race member 11 and again inserts it between the next two balls when the operations as just described are repeated.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I regard as new and desire to secure by Letters Patent, is:

1. The method of assembling ball retainers on parallel sets of balls in a two row ball bearing, which consists in assembling the balls in the parallel raceways of the bearing, placing a ball retainer having inwardly projecting ears over each set of balls, and bending ears of both retainers simultaneously around the balls to retain the retainer thereon.

2. The method of assembling ball retainers on parallel sets of balls in a two row ball bearing, which consists in assembling the balls in the parallel raceways of the bearing, placing a ball retainer having inwardly projecting ears over each set of balls, inserting a tool through a hole in one of said race members between said raceways, and bending ears of both retainers simultaneously around the balls to retain the retainers thereon.

3. The method of assembling ball retainers on parallel sets of balls in a two row ball bearing, which consists in assembling the balls in the parallel raceways of the bearing, placing a ball retainer having inwardly projecting ears over each set of balls, inserting a tool through a hole in one of said race members between said raceways, holding said retainers, and moving said tool with respect to the retainers whereby the tool will force the ears of the retainers about said balls.

4. The method of assembling ball retainers on parallel sets of balls in a two row ball bearing, which consists in assembling the balls in the parallel raceways of the bearing, placing a ball retainer having inwardly projecting ears over each set of balls, inserting a tool through a hole in one of said race members between said raceways, holding said retainers, and moving said tool with respect to the retainers whereby the tool will force an ear of each retainer about a ball of the set to which that retainer belongs.

5. The method of assembling ball retainers on parallel sets of balls in a two row ball bearing, which consists in assembling the balls in the parallel raceways of the bearing, placing a ball retainer having inwardly projecting ears over each set of balls, inserting a tool through a hole in one of said race members between said raceways, holding said retainers, and moving said tool with respect to the retainers whereby the tool will force an ear of each retainer about a ball of the set to which that retainer belongs, the balls of the two sets being held opposite each other so that an ear of each retainer will be forced down by the tool at the same time.

6. The method of assembling ball retainers on parallel sets of balls in a two row ball bearing, which consists in assembling the balls in the parallel raceways of the bearing, placing a ball retainer having inwardly projecting ears over each set of balls, inserting a tool through a hole in one of said race members between said raceways, holding said retainers between clamping members, and moving said tool and outer raceway to cause said tool to force said ears about said balls.

HARRY WICKLAND.